(12) United States Patent  (10) Patent No.: US 7,627,981 B1
Doster et al.  (45) Date of Patent: Dec. 8, 2009

(54) RODENT TRAP

(76) Inventors: John W Doster, 19850 W. Stateline Rd., South Bend, IN (US) 46637; Kenneth Berzai, 19850 W. Stateline Rd., South Bend, IN (US) 46637; Nathan Berzai, 19850 W. Stateline Rd., South Bend, IN (US) 46637

( * ) Notice: Subject to any disclaimer, the term of this patent is extended or adjusted under 35 U.S.C. 154(b) by 193 days.

(21) Appl. No.: 11/868,776

(22) Filed: Oct. 8, 2007

(51) Int. Cl.
*A01M 23/10* (2006.01)
(52) U.S. Cl. .............................. 43/71; 43/74; 242/599.1
(58) Field of Classification Search ...................... 43/71, 43/72, 74; 193/35 R, 37; 492/16, 38, 39, 492/40, 41; 15/230.11; 242/599.1, 599.2, 242/599.4, 578, 615.2
See application file for complete search history.

(56) References Cited

U.S. PATENT DOCUMENTS

| | | | | |
|---|---|---|---|---|
| 1,028,506 | A | * | 6/1912 | Thieme .................... 242/129.6 |
| 1,050,220 | A | | 1/1913 | Link |
| 1,353,882 | A | | 9/1920 | Wojcik |
| 1,820,579 | A | | 8/1931 | Nakagawa |
| 2,234,983 | A | | 3/1941 | Russell |
| 2,579,093 | A | | 12/1951 | Roesner |
| 2,775,844 | A | | 1/1957 | Barnes |
| 2,825,995 | A | | 3/1958 | Snider |
| 3,778,923 | A | | 12/1973 | Cuoco |
| 3,984,891 | A | * | 10/1976 | Weinmann ................... 14/69.5 |
| 4,191,342 | A | * | 3/1980 | Reinhold .................. 242/599.3 |
| 4,241,531 | A | | 12/1980 | Nelson et al. |
| 4,662,101 | A | | 5/1987 | Fisher |
| 5,165,620 | A | * | 11/1992 | Kampiziones ........... 242/573.2 |
| 5,517,784 | A | | 5/1996 | Sedore |
| 5,528,852 | A | | 6/1996 | Sarff |
| D382,039 | S | | 8/1997 | Zyra |
| 5,720,126 | A | | 2/1998 | Lamb |
| 5,782,034 | A | | 7/1998 | Robin et al. |
| 5,996,274 | A | | 12/1999 | Smith et al. |
| 6,212,819 | B1 | | 4/2001 | Edwards |
| 6,280,371 | B1 | * | 8/2001 | Krippelz ....................... 492/39 |
| 6,739,086 | B1 | | 5/2004 | Lamb |
| 2002/0144364 | A1 | * | 10/2002 | Anderson et al. ............ 14/69.5 |

* cited by examiner

*Primary Examiner*—Michael R Mansen
*Assistant Examiner*—Joshua J Michener
(74) *Attorney, Agent, or Firm*—Botkin & Hall, LLP

(57) ABSTRACT

A rodent trap for use with a vessel suitable for containing a rodent is disclosed. The rodent trap includes a bait holder assembly for bridging the top opening of the vessel. The bait holder assembly includes an inner cylinder with an outer diameter, a pair of outer cylinders positioned in telescoping fashion on opposite ends of the inner cylinder, and a rotating cylinder. Each of the outer cylinders has an outer diameter. The outer, the inner and the rotating cylinders share an axis, and the rotating cylinder has an inner diameter greater than the outer diameter of the outer cylinders so that the rotating cylinder is freely rotatable on the outer cylinders on the axis. Paddles for treating with rodent bait are secured for rotation to the rotating cylinder.

9 Claims, 5 Drawing Sheets

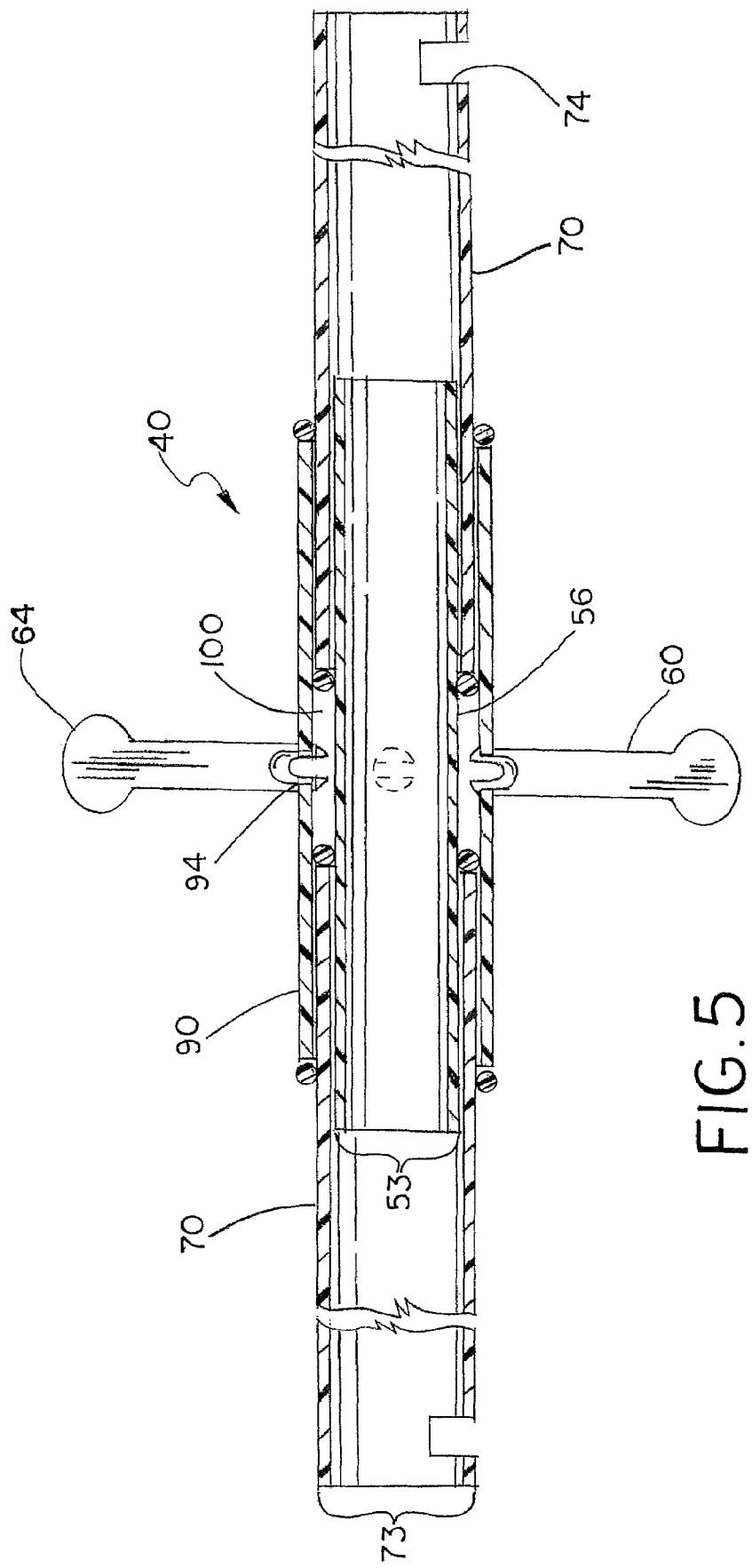

RODENT TRAP

BACKGROUND OF THE INVENTION

1. Field of the Invention

This invention relates generally to animal traps and, more particularly, to an improved rodent trap.

2. Description of the Background of the Invention

Before the development of the present invention, the following shortcomings in rodent traps have been observed: they are single-use only; that is, once a rodent has been caught, the entire trap must be discarded with the dead rodent; re-baiting is typically required; there is no means for masking the odor associated with decomposition of the rodent; dependence on toxic chemicals or proprietary, specially-manufactured parts to achieve their goals; they may cause injury to a user while setting; they are noisy; they may only maim or injure the rodent instead of killing it; catch and release is not an option; and prior rodent traps are difficult to assemble and often do not work properly as a result.

There therefore remains a need for an improved rodent trap that solves these shortcomings. The present invention is directed toward meeting this need.

SUMMARY OF THE INVENTION

The present invention relates to an improved rodent trap for use with a vessel suitable for containing a rodent. The vessel includes a bottom, a top opening with a lip, and a wall extending between the bottom and the lip of the vessel. The rodent trap includes a bait holder assembly for bridging the opening of the vessel. The bait holder assembly includes an inner cylinder having an outer diameter, a pair of outer cylinders positioned in telescoping fashion on opposite ends of the inner cylinder, and a rotating cylinder. Each of the outer cylinders has an outer diameter. The outer, inner, and rotating cylinders have an axis, and the rotating cylinder has an inner diameter greater than the outer diameter of the outer cylinders so that the rotating cylinder is freely rotatable on the outer cylinders on the axis.

In one aspect of the invention, the rodent trap includes a bridge means for bridging the ground surface and the lip of the vessel so that a rodent can move on the ground to the lip of the vessel. Each of the outer cylinders may include a notch at one end for receiving the lip of the vessel.

In another aspect, the bridge means defines at least two segments having interlocking ends. The segments may include a top surface with ribs formed therein.

In still another aspect, the rodent trap may have a first stop for preventing axial movement of the pair of cylinders on the inner cylinder. In still another aspect, the rodent trap may include a second stop for preventing axial movement of the rotating cylinder on the outer cylinder. In another aspect, the exterior wall of the inner cylinder, the interior wall of the rotating cylinder, and the opposing ends of the pair of cylinders define an enclosed space. In another aspect, at least two outwardly extending paddles may be connected to the rotating cylinder.

One object of the present invention is to provide an improved rodent trap, which trap does not have to be constantly re-baited. Related objects and advantages of the present invention will be apparent from the following description.

BRIEF DESCRIPTION OF THE DRAWINGS

FIG. 5 is a cross-sectional view taken along lines 5-5 of FIG. 2.

DETAILED DESCRIPTION OF INVENTION

Figure 1:
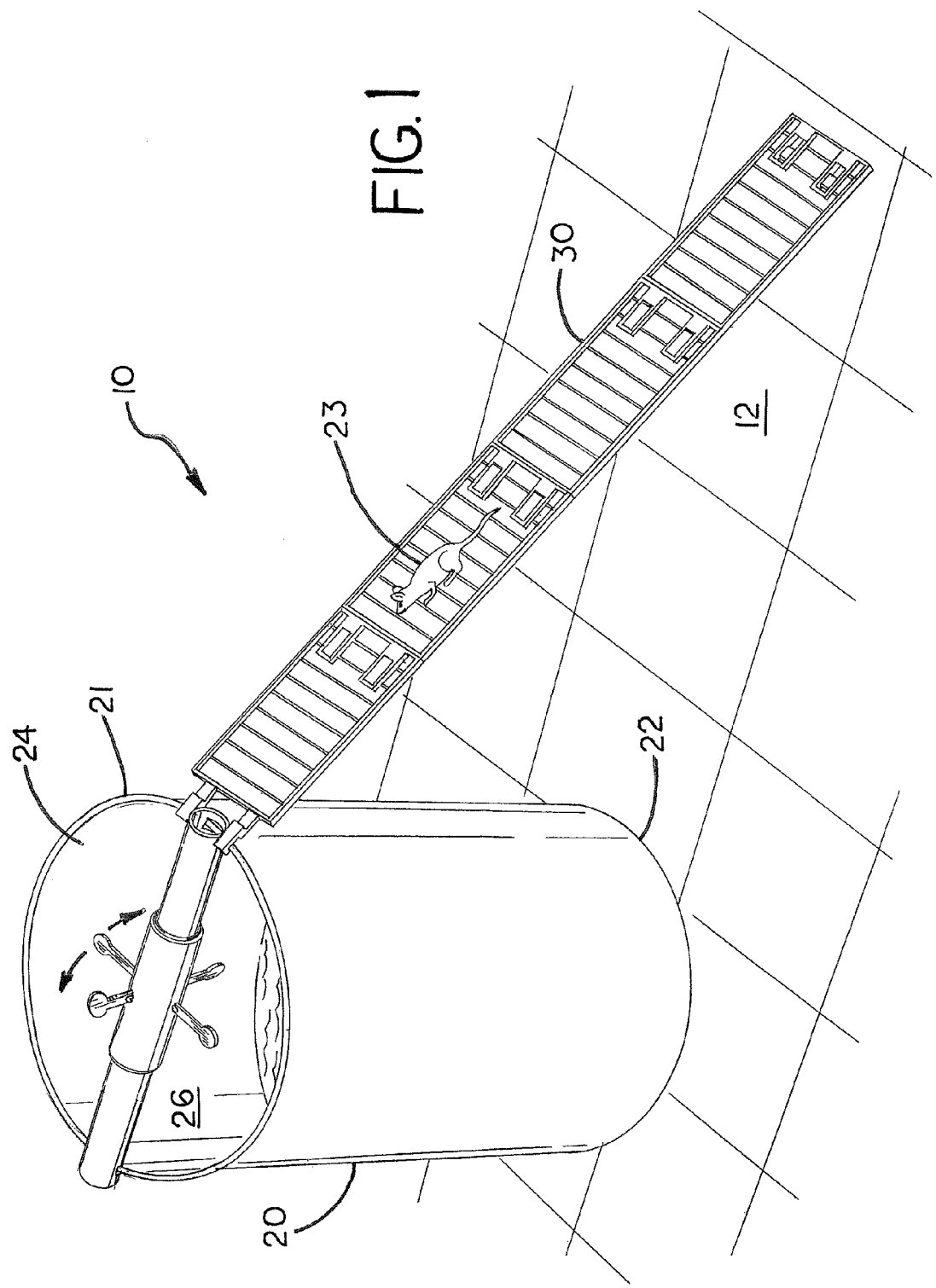
FIG. 1 is an elevated perspective view showing an embodiment of the rodent trap of the invention assembled on a vessel.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

With reference to the figures, an improved rodent trap 10 is shown assembled with a vessel 20, which includes a bottom 22, a top opening 24, a lip 21, and a wall 26 joining the lip 21 and the bottom 22. A water pail, a typical five-gallon bucket, a barrel, or other vessel suitable for containing a rodent may be used with trap 10. To the extent that the user may want to catch and release the rodent, the vessel 20 may be empty. In the alternative, the vessel 20 may be filled with water, molasses, ethylene glycol, or other substance lethal to rodents. A fragrance may be included with the solution(s) contained in the vessel 20 to help diffuse the stink of decomposition.

In an embodiment, a bridge 30 formed from segments 34 interlocks at ends 32 and bridges the ground surface 12 with the lip 21 of the vessel 20. Segments 34 enable disassembly of the bridge and facilitate packaging of the trap 10 for efficient shipping and handling. The bridge 30 includes a top surface 36 that has upstanding ribs 38, which provide a non-skid surface so that the rodent 23 may easily climb bridge 30 and access bait holder assembly 40.

The bait holder assembly 40 of the rodent trap 10 includes an inner cylinder 50, a pair of outer cylinders 70, and a rotating cylinder 90. Each of the cylinders 50, 70, and 90, is formed from plastic, wood, cardboard, or other rigid material so long as bait holder assembly 40 can support the weight of the rodent 23 and resist wear and tear. The preferred material from which to make the trap, however, is at present plastic. Plastic parts clean easily, are light in weight and can be stacked and shipped without significant expense.

Figure 4:
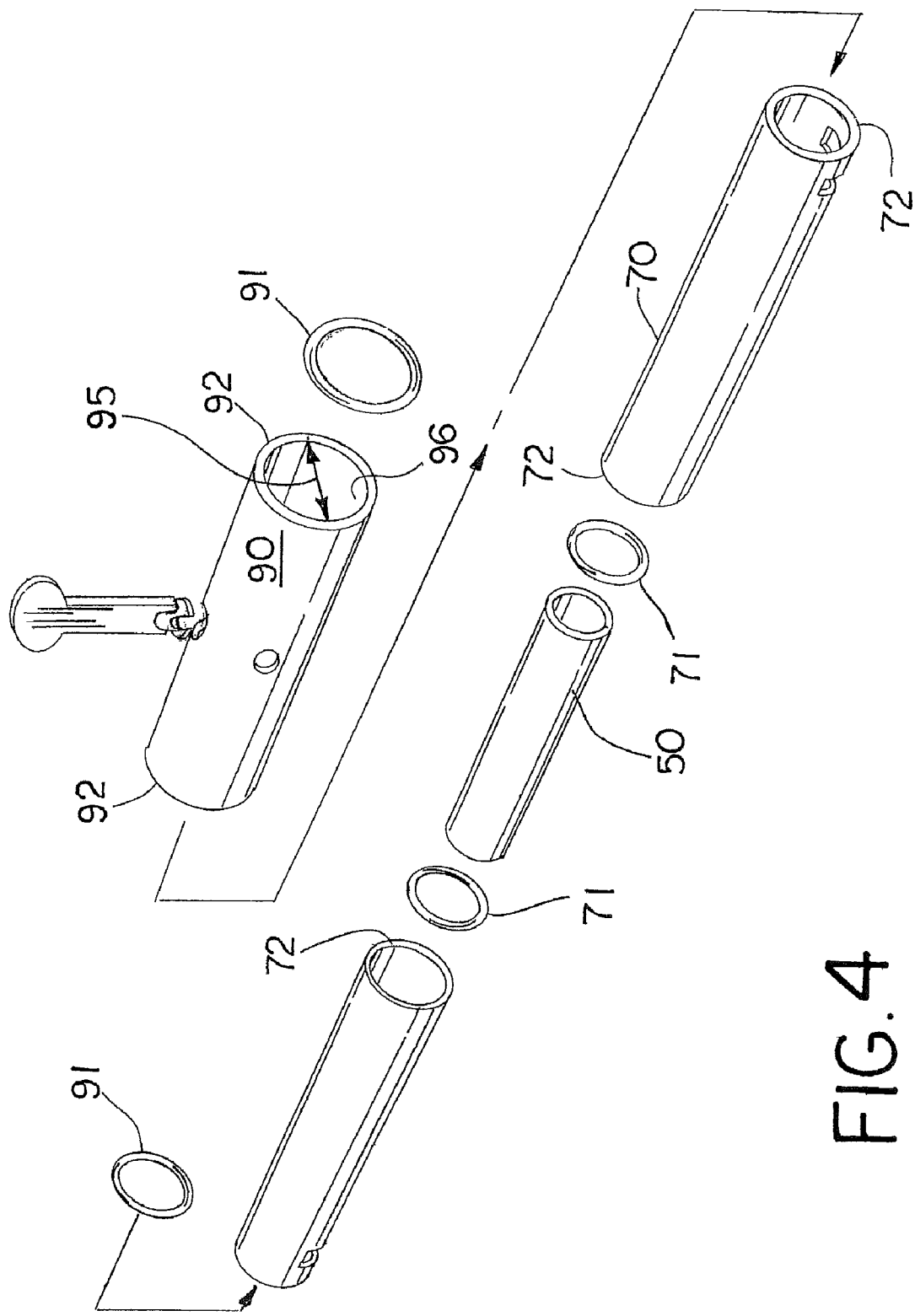
FIG. 4 is an exploded perspective view showing the bait holder assembly of the invention disassembled.

Referring to FIGS. 4 and 5, the inner cylinder 50 includes an exterior wall 56 having an outer diameter 53. The outer cylinders 70 have opposite ends 72, each of which has an outer diameter 73. The rotating cylinder 90 has opposing ends 92, interior wall 96, and an inner diameter 95. In an embodiment, a pair of paddles 60 with enlarged ends 64 is secured to the rotating cylinder 90. In a more preferred embodiment, four paddles 60 with ends 64 are inserted into bores 94 equally distributed about and extending through the wall of the rotating cylinder 90. Resilient clip ends 62 secure the paddles 60 to the rotating cylinder 90. Rodent bait, such as cheese, peanut butter, or other food may be adhered to or otherwise used to treat the ends 64 of the paddles so that rodents are attracted to the paddles 60.

Stops 71, 91 circumscribe, respectively, the inner cylinder 50 and the outer cylinders 70. In an embodiment, the stops 71, 91 are formed from a suitably elastic material so they are easily slidable along the length of their respective cylinders. The inventor has obtained favorable results using elastic fabric from which to form stops 71, 91. It should be understood that other materials may be used to make the ring shaped filaments that comprise the stops 71, 91, and disclosure of the foregoing embodiment is by no means limiting with respect to the manufacture of the stops.

The stops also snugly fit the cylinders to prevent unwanted axial movement of the cylinders. On the other hand, however, the stops are loose enough so that the user can grasp the cylinders 70 and pull them axially outward so as to span the opening 24 of the vessel 20 enabling notch 74 to receive the lip 21 of small, medium and large vessels 20. In this connection, in an embodiment, the inner cylinder has a length of between about five and eleven inches. The outer cylinders 70 have a length of between about five and nine inches, and the rotating cylinder 90 has a length of between about three and nine inches.

Figure 2:
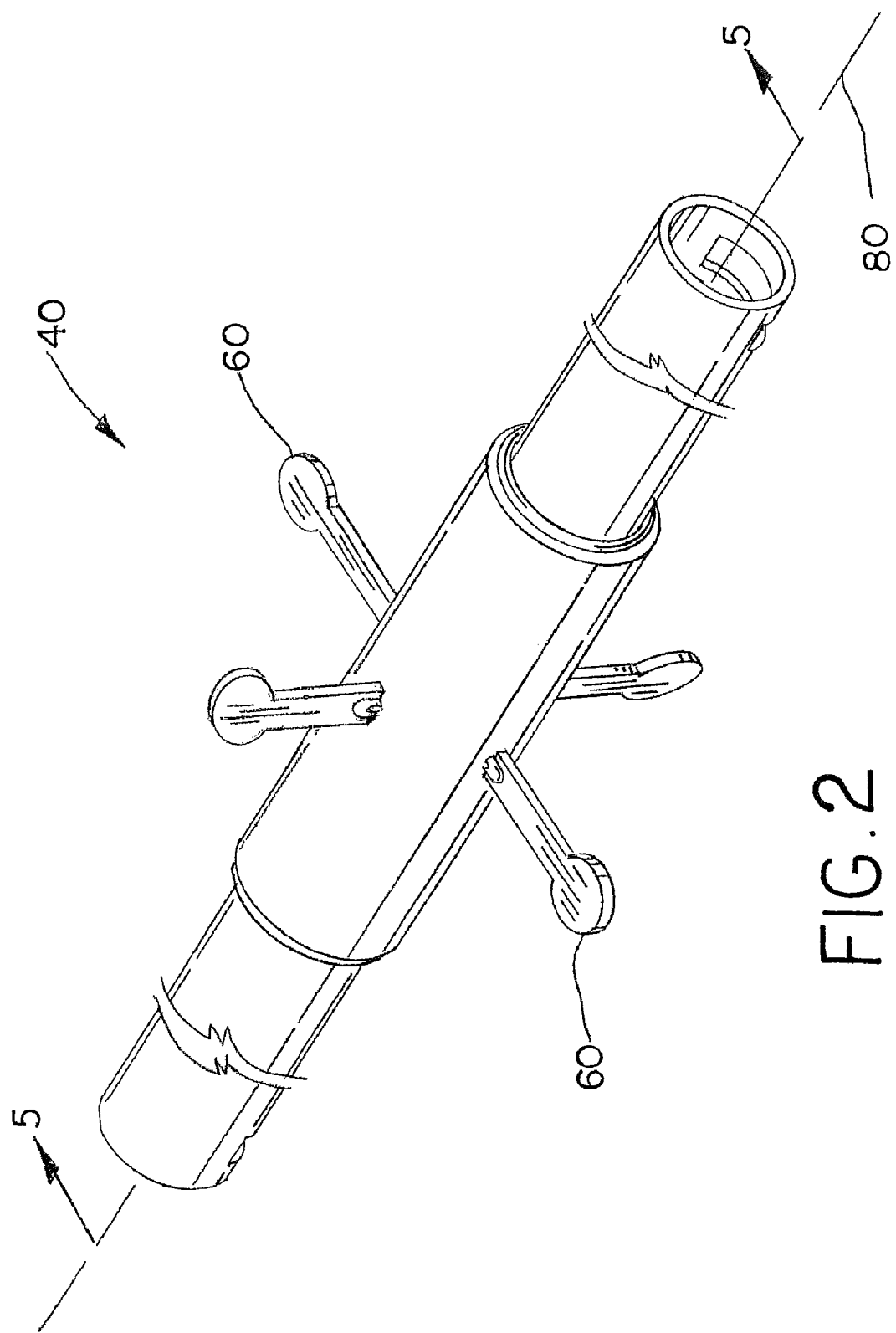
FIG. 2. is a perspective view showing an embodiment of the bait holder assembly of the invention.
Figure 3:
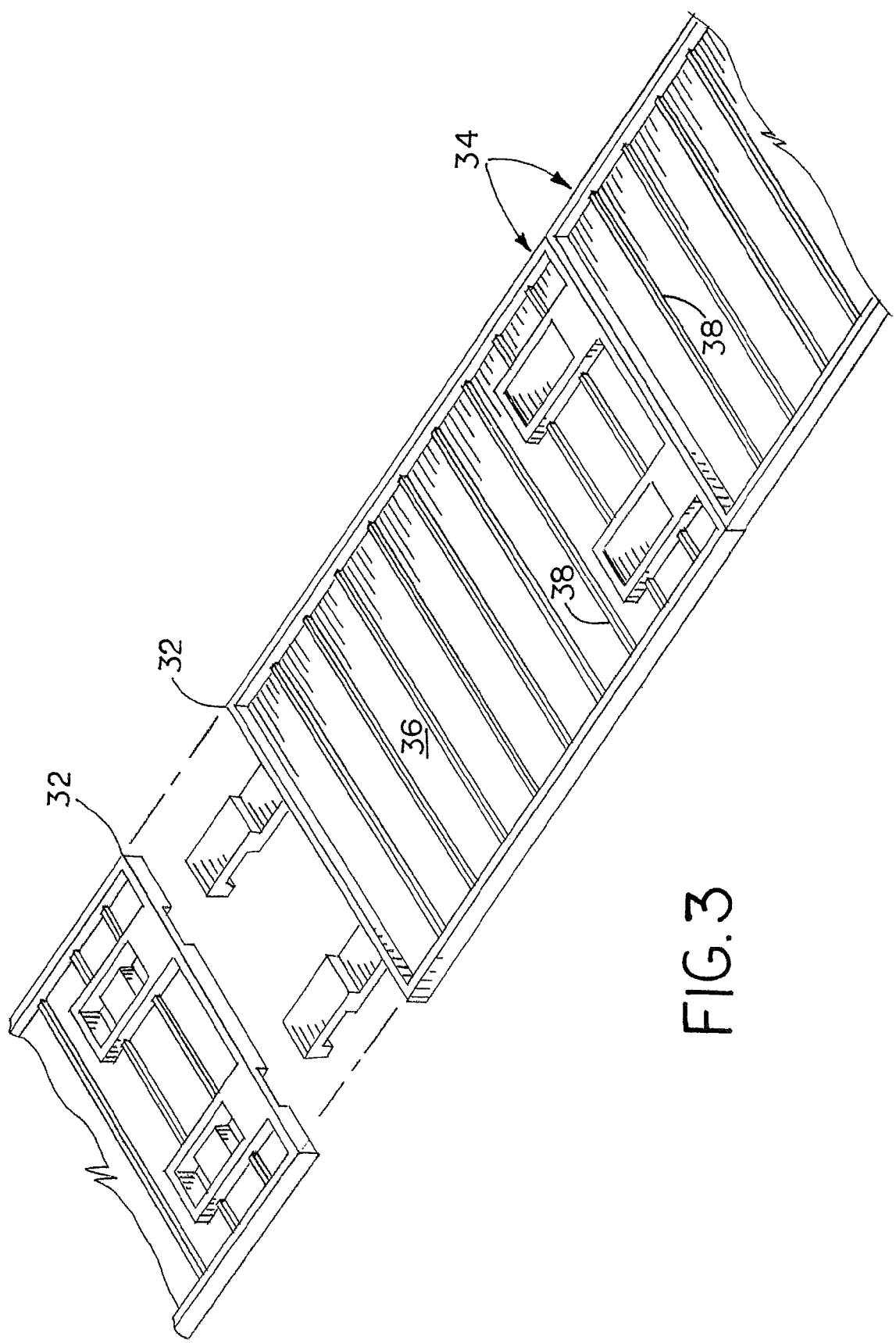
FIG. 3 is a perspective view showing an embodiment of the inter-locking bridge segments of the invention.

All of the cylinders 50, 70, and 90 have the same axis 80 and are assembled in telescoping fashion as illustrated in FIG. 4. Each of the outer cylinders 70 is positioned on opposite ends of the inner cylinder 50 with stops 71 between the cylinders 70, as shown in FIG. 4. One of the stops 91 is positioned on one of the outer cylinders 70. The inner diameter 95 of the rotating cylinder 90, which is the outermost cylinder, is greater than the outer diameter 73 of the outer cylinders 70. With the cylinders assembled, as shown in FIG. 2, the exterior wall of the inner cylinder 50, the interior wall of the rotating cylinder 90 and the ends 72 of the outer cylinders 70 form an enclosed space 100, within which the resilient clip ends 62 of the paddles reside. The ends 62 do not contact the outer surface of the inner cylinder 50. As a result, the rotating cylinder 90 is freely rotatable on the outer cylinders 70 so that the rodent falls into the vessel 20 when it proceeds to step from the outer cylinder 70 onto the rotating cylinder 90.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A rodent trap comprising:
   a vessel suitable for containing a rodent, said vessel having a bottom, a top opening with a lip, and a wall joining the bottom and the lip;
   a bait holder assembly bridging said opening, said bait holder assembly including an inner cylinder having an outer diameter, a pair of outer cylinders positioned in telescoping fashion on opposite distal ends of said inner cylinder, said outer cylinders having an inner diameter greater than said outer diameter of said inner cylinder, and a rotating cylinder, each of said outer cylinders also having an outer diameter, said outer, inner and rotating cylinders having an axis, and said rotating cylinder having an inner diameter greater than said outer diameter of said outer cylinders so that said rotating cylinder is freely rotatable on the outer cylinders on said axis; and
   paddles located between ends of said rotating cylinder.

2. The rodent trap according to claim 1 further comprising a bridge means for bridging the ground surface and the lip of said vessel, wherein a rodent can move from the ground to said lip of said vessel, and wherein said outer cylinders each include a notch for contacting said lip, said notches preventing rotation of said outer cylinders relative to said vessel.

3. The rodent trap according to claim 2, wherein said bridge means defines at least two segments having interlocking ends.

4. The rodent trap according to claim 3, wherein said segments include a top surface with ribs formed therein.

5. The rodent trap according to claim 1 further comprising a first stop for preventing axial movement of said pair of cylinders on said inner cylinder.

6. The rodent trap according to claim 5 further comprising a second stop for preventing axial movement of said rotating cylinder on said outer cylinders.

7. The rodent trap according to claim 6, wherein an exterior wall of said inner cylinder and an interior wall of said rotating cylinder and the opposite ends of said pair of cylinders define a space.

8. The rodent trap according to claim 7, wherein at least two outwardly extending paddles are connected to the rotating cylinder.

9. The rodent trap according to claim 1, wherein said paddles are substantially equidistant of each said end of said rotating cylinder so that a rodent will be encouraged to step onto said rotating cylinder.

\* \* \* \* \*